United States Patent
Abe

(10) Patent No.: US 10,464,377 B2
(45) Date of Patent: Nov. 5, 2019

(54) WINTER TIRE

(71) Applicant: Sumitomo Rubber Industries, Ltd., Kobe-shi, Hyogo (JP)

(72) Inventor: Shotaro Abe, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 300 days.

(21) Appl. No.: 15/267,260

(22) Filed: Sep. 16, 2016

(65) Prior Publication Data
US 2017/0100967 A1    Apr. 13, 2017

(30) Foreign Application Priority Data
Oct. 8, 2015    (JP) .................. 2015-200417

(51) Int. Cl.
| | |
|---|---|
| *B60C 11/16* | (2006.01) |
| *B60C 11/117* | (2006.01) |
| *B60C 11/14* | (2006.01) |
| *B60C 11/03* | (2006.01) |

(52) U.S. Cl.
CPC .......... *B60C 11/1637* (2013.01); *B60C 11/14* (2013.01); *B60C 11/16* (2013.01); *B60C 11/032* (2013.01)

(58) Field of Classification Search
CPC . B60C 11/16; B60C 11/1606; B60C 11/1637; B60C 11/032; B60C 2011/0381
USPC ....................................................... D12/608
See application file for complete search history.

(56) References Cited

U.S. PATENT DOCUMENTS

| | | | | |
|---|---|---|---|---|
| 2008/0277038 A1* | 11/2008 | Guichon | ............ | B29D 30/0606 152/209.1 |
| 2015/0251367 A1* | 9/2015 | Cocural | ............. | B29D 30/0606 264/219 |

FOREIGN PATENT DOCUMENTS

| | | | | |
|---|---|---|---|---|
| CA | 2773438 A1 * | 5/2011 | ......... | B60C 11/1625 |
| CA | 2 773 438 C | 12/2015 | | |
| DE | 10 2009 044 547 A1 | 5/2011 | | |
| EP | 2 165 859 A1 | 3/2010 | | |
| EP | 2955037 A1 | 12/2015 | | |
| JP | 62094402 A * | 4/1987 | | |
| JP | 5-286320 A | 11/1993 | | |
| JP | 2010070055 A * | 4/2010 | ............. | B60C 11/16 |
| JP | 2014-151740 A | 8/2014 | | |

OTHER PUBLICATIONS

Machine Translation: JP-62094402-A; Ogawa, Masaki; (Year: 2019).*
Machine Translation: JP-2010070055-A; Sato, Kenichi; (Year: 2019).*
Extended European Search Report dated Feb. 22, 2017, in European Patent Application No. 16187515.8.

* cited by examiner

*Primary Examiner* — Kendra Ly
(74) *Attorney, Agent, or Firm* — Birch, Stewart, Kolasch & Birch, LLP

(57) ABSTRACT

A winter tire includes a tread portion with a ground contact surface. The ground contact surface of the tread portion is provided with a recess. The recess is provided with a hole for fixing a stud pin and at least one projection extending radially outwardly and arranged at a location apart from the hole.

14 Claims, 7 Drawing Sheets

WINTER TIRE

BACKGROUND ART

Field of the Invention

The present invention relates to winter tires, and in particular relates to a winter tire having an excellent performance on ice.

Description of the Related Art

Conventionally, winter studded tires having a tread portion provided with metal stud pins have been proposed. Since the stud pins are designed to dig into ice, such a winter tire can increase frictional force between the ground contact surface of the tread portion and icy road. Unfortunately, conventional winter tires have a problem that stud pins may be covered with small pieces of ice (hereinafter, referred to as "ice dusts") that had been chipped off from the icy road by the stud pins during traveling on ice. The ice dusts may lower relative heights of the respective stud pins from the ground contact surface of the tread portion, and thus some stud pins may lose ability to dig into icy road to generate sufficient frictional force.

Japanese Unexamined Patent Application Publication No. 2014-151740 discloses a winter studded tire that includes a tread portion provided with a recess having a bottom with a hole and a stud pin embedded into the hole. The recess provides a space around the stud pin to hold or catch ice dusts that had been chipped off from the surface of ice during traveling, and the ice dusts held in the recess then may be released from the recess according to rotation of the tire.

Unfortunately, the studded tire disclosed by the above publication also has a problem that the ice dusts may stay in the recess over a prolonged period of time so that the stud pin would lose ability to dig into icy road.

SUMMARY OF THE INVENTION

The present invention has been made in view of the circumstances described above, and has a major object to provide a winter tire capable of exerting an excellent performance on icy road.

According to one aspect of the invention, a winter tire includes a tread portion with a ground contact surface. The ground contact surface is provided with a recess. The recess is provided with a hole for fixing a stud pin and at least one projection extending radially outwardly and arranged at a location apart from the hole.

In another aspect of the invention, the recess may include a bottom surface, and the hole and the at least one projection may be provided on the bottom.

In another aspect of the invention, the bottom surface may be substantially in parallel with the ground contact surface.

In another aspect of the invention, the at least one projection may extend radially outwardly of the tire beyond the ground contact surface.

In another aspect of the invention, the at least one projection may include a plurality of projecting pieces that are arranged so as to surround the hole.

In another aspect of the invention, in a plan view of the tread portion, the hole may have a circular contour shape, and the projecting pieces may include at least one first projecting piece curved in a same curvature direction as the circular contour shape of the hole.

In another aspect of the invention, the projecting pieces may include at least one second projecting piece curved in an opposite curvature direction to the circular contour shape of the hole.

In another aspect of the invention, the projecting pieces may include at least one second projecting piece curved in an opposite curvature direction to the circular contour shape of the hole.

In another aspect of the invention, each of the projecting pieces may have a flat cross-sectional shape having a long axis (a) and a short axis (b).

In another aspect of the invention, the at least one projection may be configured to a continuous rib so as to surround the hole.

In another aspect of the invention, a stud pin may be embedded into the hole.

DESCRIPTION OF THE PREFERRED EMBODIMENTS

An embodiment of the present invention will be explained below with reference to the accompanying drawings.

Figure 1:
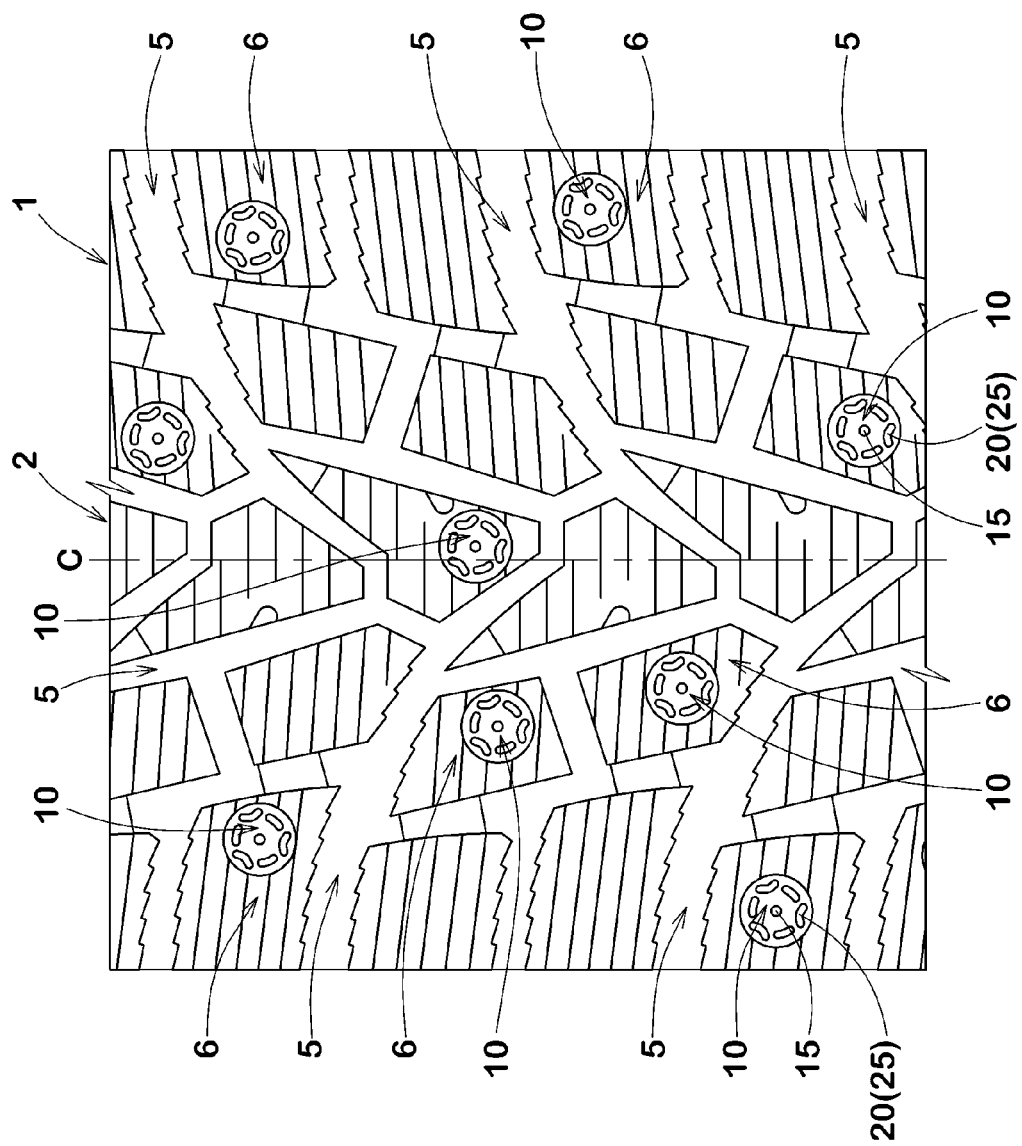
FIG. 1 is a development view of a tread portion of a winter tire according to an embodiment of the present invention.

FIG. 1 illustrates a development view of a tread portion 2 of a winter pneumatic tire 1 according to an embodiment of the present invention. In this embodiment, the winter tire 1 is suitably used for passenger cars, for example.

The tread portion 2, for example, is provided with a plurality of blocks 6 having ground contact surfaces separated by a plurality of grooves 5. The tread portion 2, for example, may include a rib that continuously extends in the circumferential direction of the tire. Some blocks 6 are provided with recesses 10 on the ground contact surfaces.

Figure 2A:
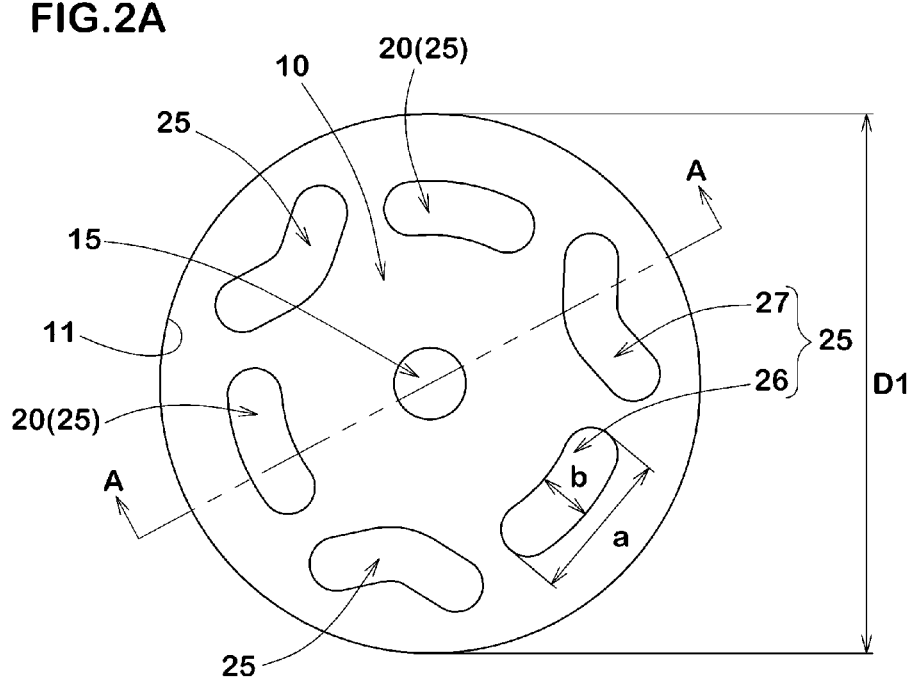
FIG. 2A is an enlarged plan view of a recess of FIG. 1.
Figure 2B:
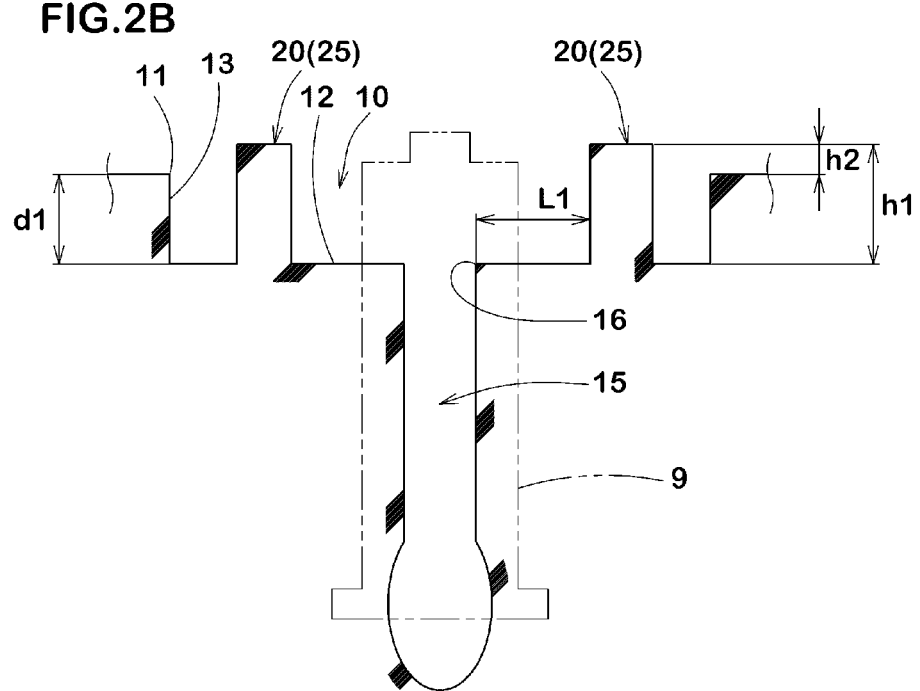
FIG. 2B is a cross-sectional view of the recess taken along a line A-A of FIG. 2A FIG. 3A and FIG. 3B are enlarged plan views of recesses in accordance with another embodiment of the invention.

FIG. 2A illustrates an enlarged plan view of one of the recesses 10. FIG. 2B illustrates a cross-sectional view of the recess 10 taken along a line A-A of FIG. 2A. As illustrated in FIGS. 2A and 2B, the recesses 10, for example, includes an edge 11 having a closed contour on the ground contact surface. The contour of the recess 10 may be configured to various shapes, e.g., a circular shape, elliptical shape, oval shape, polygonal shape and the like. In this embodiment, the recess 10 is configured to have a circular contour shape.

The recess 10 includes a bottom surface 12 and an inner periphery surface 13. The bottom surface 12 extends substantially in parallel with the ground contact surface of the block, for example. The inner periphery surface 13 extends between the ground contact surface of the block and the bottom surface 12. In this embodiment, the inner periphery surface extends along in the radial direction of the tire. Alternatively, the inner periphery surface 13 of the recess 10 is not limited to the above aspect, but may have a depth gradually increasing from the edge 11.

The bottom surface 12 of the recess 10 is provided with a hole 15 for fixing a stud pin 9 as illustrated by a two-dot chain line. The hole 15, for example, has an internal diameter smaller than an outer diameter of the stud pin 9. Prior to use, the stud pin 9 would firmly be embedded into the hole 15 so that the tip end of the stud pin 9 protrudes from the ground contact surface of the tread portion 2. Thus, the tire would generate large traction on icy road. In this embodiment, the hole 15, for example, has a circular contour shape in a plan view of the tread portion 2.

The bottom surface 12 of the recess 10 is further provided with at least one projection 20 extending radially outwardly and arranged at a location apart from the hole 15. The detail shape of the projection 20 in a plan view of the tread portion 2 will be described later.

The recess 10 can provide a space around the stud pin 9 to temporarily hold or catch ice dusts that had been chipped off from the ice during traveling on icy road, and can prevent the stud pin 9 from being covered with ice dusts so that the sufficient protruding height of the stud pin 9 is ensured. On the other hand, since the at least one projection 20 is located apart from the hole 15, it can elastically deform upon receiving ground contact pressure. The elastic deformation of the projection 20 can function to push out the ice-dusts from the recess 10 effectively (e.g. self-cleaning feature). By repeating the above function, ice dusts do not stay in the recess 10, and therefore an excellent traveling performance on icy road can continuously be obtained.

In order to further improve the above mentioned effects, the internal diameter D1 of the recess 10 is preferably in a range of from 10 to 20 mm, for example. Preferably, the depth dl of the recess 10 is in a range of from 0.2 to 1.5 mm, for example. Such a recess 10 would provide sufficient space to catch or hold ice dusts. However, the recess 10 is not particularly limited to the above specification, but the recess 10 can be embodied in various specifications.

Preferably, the height h1 of the projection 20 from the bottom surface 12 is in a range of from 0.3 to 2.5 mm in order to obtain preferred self-cleaning feature of the projection 20, for example. In a preferred embodiment, the projection 20, for example, extends radially outwardly beyond the ground contact surface of the tread portion 2. Preferably, the height h2 of the top end of the projection 20 from the ground contact surface of the tread portion 2 is in a range of from 0.1 to 1.0 mm, for example. Such a projection 20 can largely deform to push out ice dusts from the recess 10 effectively since the top end thereof can come into contact with the ground.

The minimum distance L1 from edge 16 of the hole 15 to the projection 20 is preferably in a range of not less than 1.0 mm, more preferably not less than 2.5 mm, but preferably not more than 5.0 mm, more preferably not more than 3.5 mm. In a preferred embodiment, the distance L1 is greater than the height h1 of the projection 20. Thus, sufficient space for which the projection can elastically deform would be ensured between the projection 20 and the hole 15.

Next, the detail shape of the projection 20 in a plan view of the tread portion 2 will be described. As illustrated in FIG. 2A, the at least one projection 20 according to the embodiment includes a plurality of projecting pieces 25 that are separately arranged so as to surround the hole 15. In this embodiment, since each projecting piece 25 can elastically deform in various directions, ice dusts in the recess 10 can be pushed out from the recess 10 effectively.

The projecting pieces 25 have flat cross sections, which are sections in parallel with the ground contact surface, having long axes (a) and short axes (b), for example. In this embodiment, the projecting pieces 25 can easily deform so as to bend around the long axes (a). Furthermore, since a plurality of projecting pieces 25 are arranged in such a manner that the long axes (a) have different directions, the projecting pieces 25 can deform different directions from one another.

Preferably, the longitudinal directions of the short axes (b) are arranged in a radial direction of the circular edge 11 of the recess 10. In a preferred embodiment, each short axis (b) of each projecting piece 25 extends along the radial direction of the circular edge 11 of the recess 10. Thus, each projecting piece 25, for example, can deform so as to fall down in the radial direction when receiving ground contact pressure, and then ice dusts held in the space between the hole 15 and the projecting pieces 25 would be effectively pushed out therefrom.

Preferably, the minimum length of the long axes (a) is in a range of from 2.5 to 5.0 mm. Preferably, the minimum length of the short axes (b) is in a range of not more than 0.5 times the minimum length of the long axes (a). Thus, the deformation of projecting pieces 25 can be promoted while ensuring the durability.

The projecting pieces 25, for example, include a first projecting piece 26 and a second projecting piece 27 which have a different shape from one another. In this embodiment, the first projecting piece 26, for example, has the same curvature direction as the circular contour shape of the hole 15. Thus, the first projecting piece 26 would deform easily so as to fall down toward the hole 15. In contrast, the second projecting piece 27, for example, has a curvature in an opposite direction to the circular contour shape of the hole. Thus, the second projecting piece 27 would deform easily so as to fall down toward the edge 11 of the recess 10. These projecting pieces 26 and 27 can more effectively push out ice dusts from the recess 10.

FIGS. 3A to 7C illustrate various other embodiments which are modified the shape of projections 20 or the shape of the recess 10. Note that the same or common elements that have already been described above are denoted the same reference numbers in FIGS. 3 to 7.

Figure 3A:
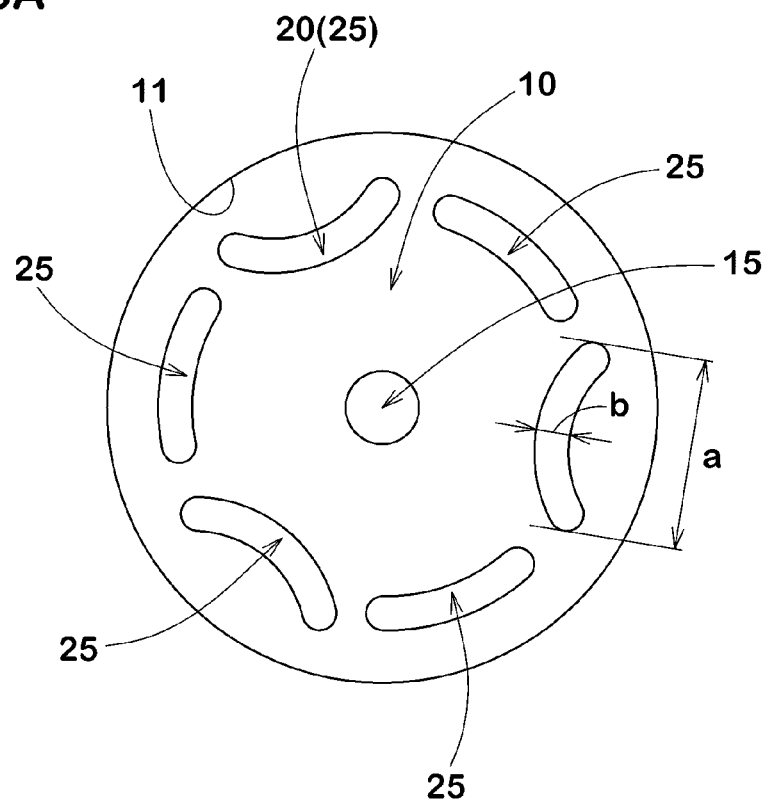

In one embodiment illustrated in FIG. 3A, each projecting piece 25 has a higher aspect ratio than each projecting piece 25 illustrated in FIG. 2A. In one embodiment, the short axes (b) may be set in a range of from 0.10 to 0.20 times the long axes (a). Such a projection piece 25 with a higher aspect ratio may deform very easily so as to clean up the inside of the recess 10 even when traveling under low ground contact pressure.

Figure 3B:
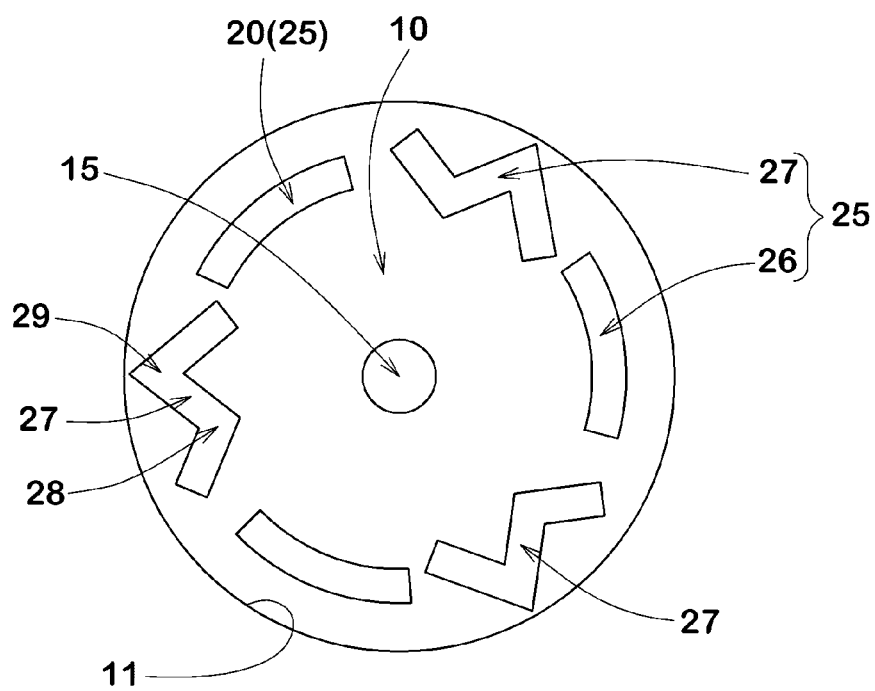

In another embodiment illustrated in FIG. 3B, the second projecting pieces 27, for example, include first portions 28 that sharply bend to protrude toward the hole 15 and second portions 29 that sharply bend to protrude toward the edge 11 of the recess 10. Such a second projecting piece 27 may elastically deform intricately while bending in the longitudinal direction when receiving the ground contact pressure, as compared with the embodiment illustrated in FIG. 3A. Thus, ice dusts in the recess 10 can be cleaned up effectively.

Figure 4A:
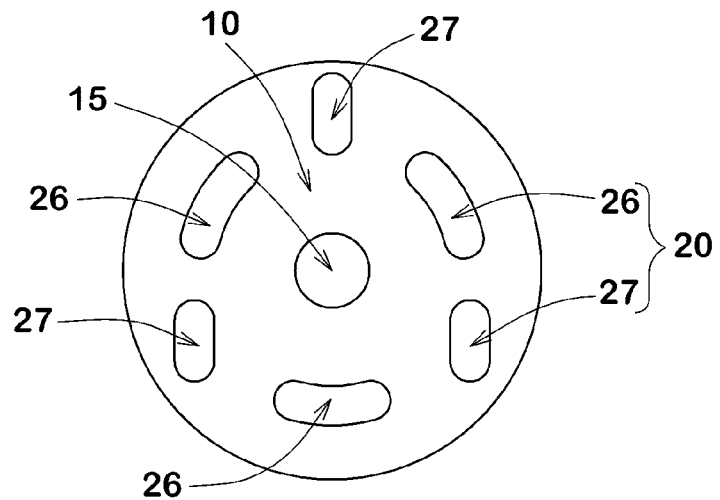
FIGS. 4A to 4C are enlarged plan views of recesses in accordance with yet another embodiment of the invention.

The first projecting pieces 26 and the second projecting pieces 27 are not particularly limited to the above aspects. FIG. 4A illustrates another embodiment of first and second projecting pieces 25 and 27. In this embodiment, the first projecting pieces 25 have a curvature in the same direction as the circular contour shape of the hole 15. The second projecting pieces 27, for example, have oval cross-sectional shapes with longitudinal directions that extend along the circumferential direction of the tire (the up and down direction in FIG. 4A). This embodiment would be able to expect the effect that ice dusts in the recess 10 can be cleaned up effectively when cornering since each second projecting piece 27 can deform in the axial direction of the tire by receiving the side force.

Figure 4B:
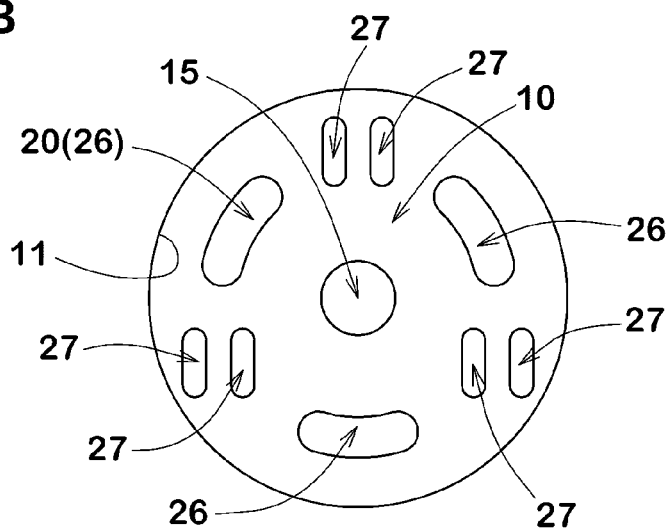

FIG. 4B illustrates yet another embodiment of a second projection piece 27. In FIG. 4B, a plurality of second projecting pieces 27 (e.g. two second projecting pieces 27) each having an oval cross-sectional shape are arranged between a pair of adjacent first projecting pieces 26 and 26. In this embodiment, each longitudinal direction of the second projecting pieces 27 extends in the circumferential direction of the tire. This embodiment may promote deformation of the second projecting pieces 27 in the axial direction of the tire.

Figure 4C:
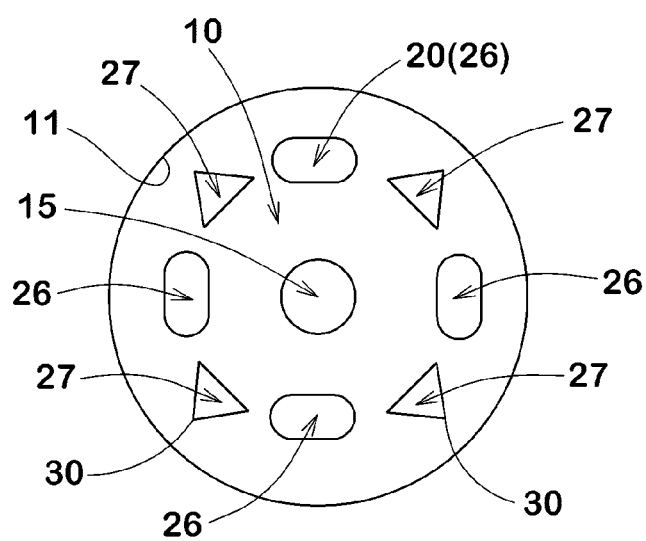

FIG. 4C illustrates yet another embodiment of the invention. In this embodiment, the at least one projection 20 includes a plurality of first projecting pieces 26 with oval cross-sectional shapes and a plurality of second projecting pieces 27 with triangular cross-sectional shapes, and the first and second projecting pieces 26 and 27 are alternately arranged around the hole 15. In a preferred embodiment, one or more second projecting pieces 27, for example, include one vertex 30 that protrudes toward the edge 11 of the recess 10. Thus, the vertex 30 of one or more second projecting pieces 27 can crush and push out ice dusts held between one of the first projecting pieces 27 and the edge 11 of the recess 10 or between one of the second projecting pieces 27 and the edge of the recess, when traveling on ice.

In the embodiment illustrated in FIGS. 4A to 4C, each of the total number of the first projecting pieces 26 and the total number of the second projecting pieces 27 is preferably in a range of from 2 to 5, more preferably 3 to 4.

Figure 5A:
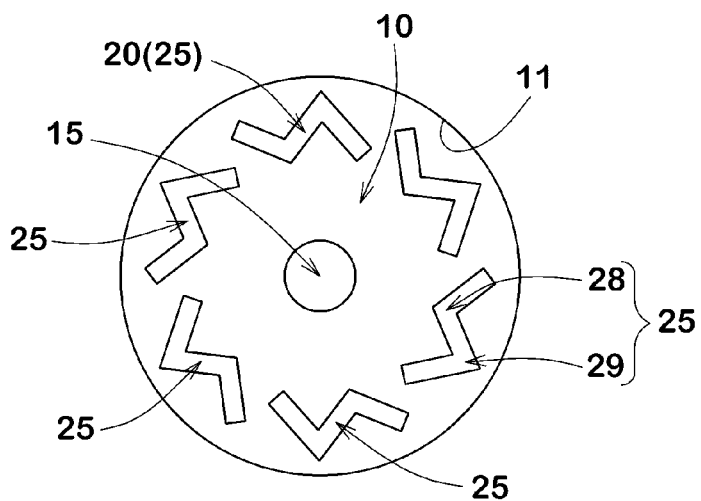
FIGS. 5A to 5C are enlarged plan views of recesses in accordance with yet another embodiment of the invention.
Figure 5B:
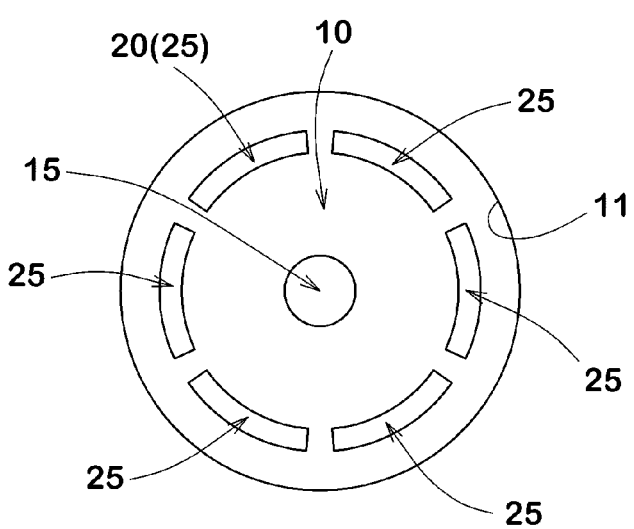
Figure 5C:
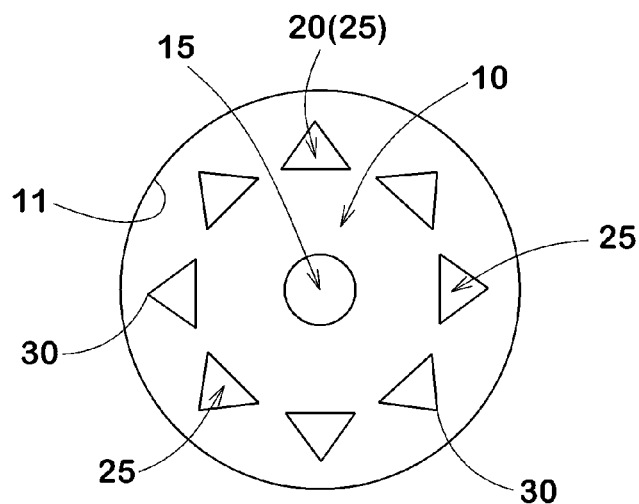

FIGS. 5A to 5C illustrate other various embodiments of projecting pieces 25.

In FIG. 5A, each projecting piece 25, for example, includes a first portion 28 that sharply bends to protrude toward the hole 15 and a second portion 29 that sharply bends to protrude toward the edge 11 of the recess 10. Such a projecting piece 25 with high rigidity may offer excellent durability.

In FIG. 5B, projecting pieces 25, for example, are curved smoothly in the same curvature direction as the circular contour of the hole 15. In this embodiment, the projecting pieces 25 are arranged concentrically with the hole 15. Such a projecting piece 25 may offer excellent durability since it can distribute the stress acting thereon. Alternatively, each projecting piece 25, for example, may extend in a straight manner.

In FIG. 5C, each projecting pieces 25, for example, has a triangular cross-sectional shape that includes one vertex 30 protruding toward the edge 11 of the recess 10. The vertex 30 of each projecting piece 25 can crush and push out ice dusts to clean up the inside of the recess 10 effectively.

In the embodiments illustrated in FIGS. 5A to 5C, the total number of the projecting pieces 25 in one recess 10 is preferably in a range of from 3 to 8, more preferably 4 to 6.

Figure 6A:
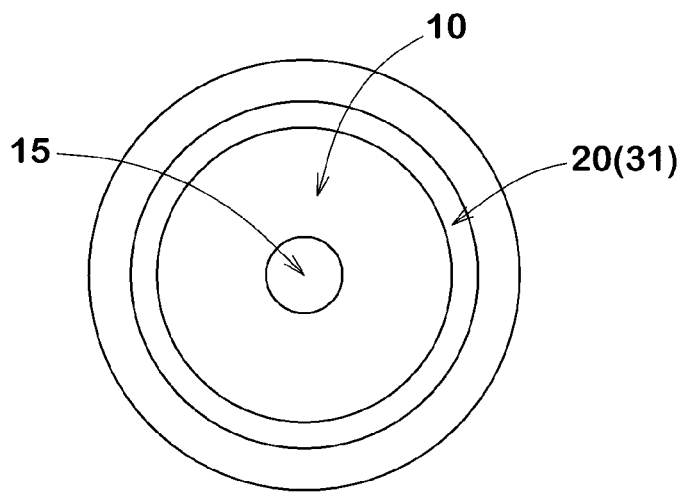
FIGS. 6A to 6C are enlarged plan views of recesses in accordance with yet another embodiment of the invention.
Figure 6B:
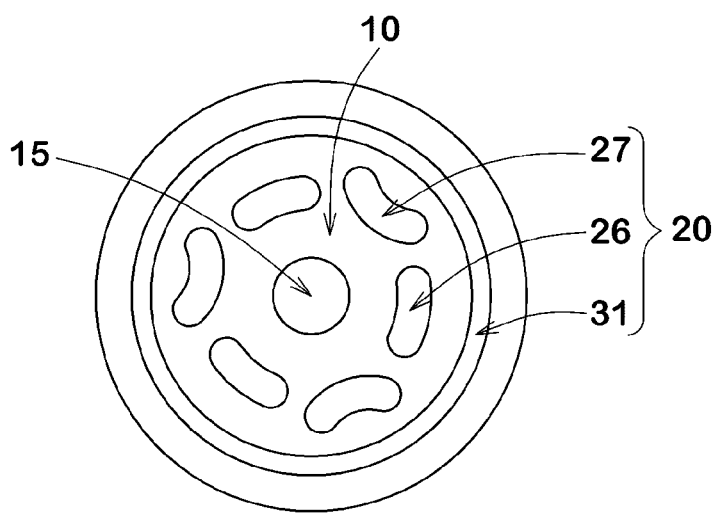
Figure 6C:
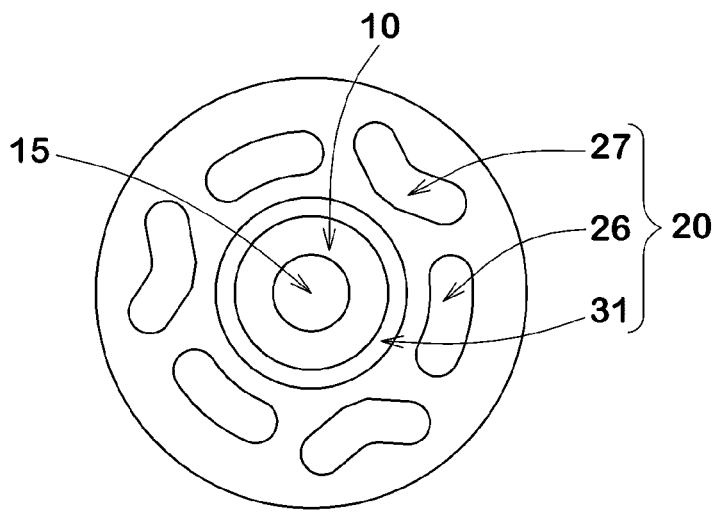

As illustrated in FIGS. 6A to 6C, the at least one projection 20 may be configured to a continuous rib 31 so as to surround the hole 15.

In FIG. 6A, as the at least one projection 20, only one continuous rib 31 is provided. In this embodiment, the rib 31 is formed as a circular shape. Note that the rib 31 is not limited to a circular shape, but may be shaped as a polygonal shape, for example. Such a rib 31 with high rigidity may offer excellent durability.

As illustrated in FIGS. 6B and 6C, the rib 31 may be provided together with a first projecting piece 26 and/or a second projecting piece 27 as described above on one recess 10. In FIG. 6B, the projections 20 include a plurality of spaced first and second projecting pieces 26 and 17 arranged in the circumferential direction of the hole 15 and the rib 31 formed so as to surround the first and second projecting pieces 26 and 27. Alternatively, as illustrated in FIG. 6C, the rib 31 may be provided inside the first projecting pieces 26 and the second projecting pieces 27. Such a configuration of the projections 20 as illustrated in FIGS. 6A to 6B can clean up the inside of the recess 10 more effectively.

Figure 7A:
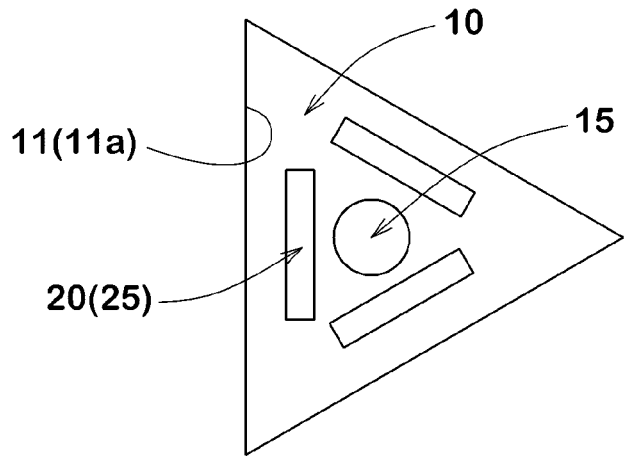
FIGS. 7A to 7C are enlarged plan views of recesses in accordance with yet another embodiment of the invention.
Figure 7B:
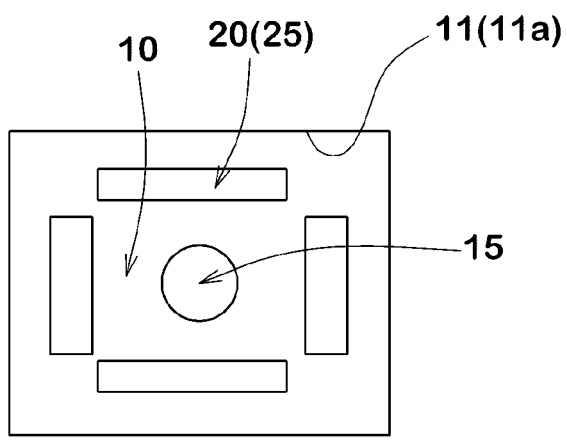
Figure 7C:
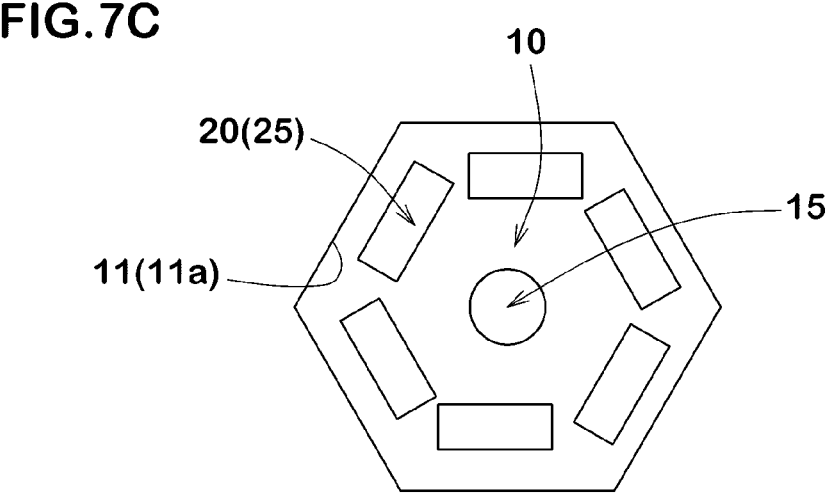

FIGS. 7A to 7C illustrate other various embodiments of the recesses 10 having polygonal shaped edges 11. In FIG. 7A, the recess 10 has a triangular edge 11. In FIG. 7B, the recess 10 has a rectangular edge 11. In FIG. 7C, the recess 10 has a hexagonal edge 11.

In the embodiment illustrated in FIGS. 7A to 7B, one or more projecting pieces 25 that extend in a straight manner are preferably arranged so as to extend along one of straightly extending sides 11a of the edge 11 of the recess 10. Such a projecting piece 25 described above can deform elastically toward the hole 15 and thus ice dusts between the edge side 11a and the projecting piece 25 can smoothly be released from the recess 10.

Alternatively, one or more straightly extending projection pieces 25 may be arranged together with a curved projection piece on one recess 10, and are preferably arranged alternately in the circumferential direction of the hole 15.

While the particularly preferable embodiments in accordance with the present invention have been described in detail, the present invention is not limited to the illustrated embodiments, but can be modified and carried out in various aspects.

EXAMPLE

Winter studded tires 205/55R16 having basic tread patterns illustrated in FIG. 1 were manufactured based on details shown in Table 1. As the comparative example tire, a winter studded tire having a ground contact surface of the tread portion where neither recesses nor projections are provided was also manufactured. Then traveling performance on ice of each tire was tested. The common specification and test method are as follows.

Rim: 16×6.5
Tire internal pressure (front/rear): 240 kPa/220 kPa
Test vehicle: FF vehicle with displacement of 1,600 cc
Tire installing locations: all wheels Traveling Performance on Ice Test:

A brake stopping distance of each test tire from 40 km/h traveling was measured under two road conditions: (1) a virgin ice with a smooth surface; and (2) a normal ice covered with snow and ice dusts. The respective test results are shown with an index in Table 1 based on the comparative example (Ref.) being 100. The smaller the value, the better the performance is.

The test results are shown in Table 1. From the test results, it is confirmed that the example tires, as compared with the comparative example tire, exert an excellent traveling performance on ice.

TABLE 1

|  | Ref. | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Configuration of recesses and projections | — | FIG. 2A | FIG. 2A | FIG. 2A | FIG. 2A | FIG. 2A | FIG. 2A | FIG. 3A | FIG. 3A |
| Diameters D1 of recesses (mm) | — | 10.0 | 10.0 | 20.0 | 10.0 | 10.0 | 10.0 | 10.0 | 10.0 |
| Depths d1 of recesses (mm) | — | 0.3 | 1.0 | 0.3 | 0.3 | 2.0 | 2.0 | 1.0 | 0.3 |
| Minimum distance L1 from hole to projections (mm) | — | 2.5 | 2.5 | 5.0 | 2.5 | 2.5 | 2.5 | 2.5 | 2.5 |
| Minimum length of long axes (a) (mm) | — | 3.0 | 3.0 | 5.0 | 3.0 | 3.0 | 3.0 | 3.0 | 2.0 |
| Minimum length of short axes (b) (mm) | — | 1.0 | 1.0 | 2.0 | 1.0 | 1.0 | 1.0 | 1.0 | 0.6 |
| Heights h1 of projections (mm) | — | 0.6 | 0.6 | 0.6 | 2.0 | 0.6 | 3.5 | 0.6 | 0.6 |
| Traveling performance on ice (1) (index) | 100 | 97 | 97 | 96 | 97 | 96 | 96 | 97 | 97 |
| Traveling performance on ice (2) (index) | 100 | 86 | 88 | 92 | 89 | 92 | 90 | 89 | 89 |

|  | Ex. 9 | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| Configuration of recesses and projections | FIG. 4A | FIG. 4A | FIG. 4B | FIG. 4C | FIG. 5A | FIG. 5B | FIG. 5B | FIG. 5C | FIG. 6A | FIG. 7C |
| Diameters D1 of recesses (mm) | 20.0 | 10.0 | 10.0 | 10.0 | 10.0 | 10.0 | 10.0 | 10.0 | 10.0 | 10 |
| Depths d1 of recesses (mm) | 0.3 | 0.3 | 0.3 | 0.3 | 0.3 | 0.3 | 0.3 | 0.3 | 0.3 | 0.3 |
| Minimum distance L1 from hole to projections (mm) | 2.5 | 2.5 | 2.5 | 2.5 | 2.5 | 2.5 | 3.0 | 2.5 | 2.5 | 2.5 |
| Minimum length of long axes (a) (mm) | 3.0 | 2.5 | 2.5 | 2.0 | 2.5 | 3.0 | 1.0 | 1.0 | — | 3.0 |
| Minimum length of short axes (b) (mm) | 1.0 | 0.6 | 0.6 | 0.6 | 0.6 | 1.0 | 0.6 | 1.0 | 1.0 | 1.0 |
| Heights h1 of projections (mm) | 0.6 | 0.6 | 0.6 | 0.6 | 0.6 | 0.6 | 0.6 | 0.6 | 0.6 | 0.6 |
| Traveling performance on ice (1) (index) | 98 | 97 | 97 | 98 | 97 | 98 | 98 | 98 | 99 | 97 |
| Traveling performance on ice (2) (index) | 88 | 91 | 86 | 90 | 90 | 91 | 90 | 91 | 92 | 91 |

What is claimed is:

1. A winter tire comprising:
a tread portion having a ground contact surface being provided with a recess, the recess having a closed contour edge on the ground contact surface, the recess being provided with a hole for fixing a stud pin and at least one projection extending radially outwardly and arranged within the closed contour edge at a location apart from the hole,
wherein the at least one projection extends radially outwardly of the tire beyond the ground contact surface, and
wherein the at least one projection is a continuous rib so as to surround the hole.

2. The winter tire according to claim 1, wherein the recess comprises a bottom surface, and the hole and the at least one projection are provided on the bottom surface.

3. The winter tire according to claim 2, wherein the bottom surface is substantially in parallel with the ground contact surface.

4. The winter tire according to claim 1, wherein the at least one projection comprises a plurality of projecting pieces that are arranged so as to surround the hole.

5. The winter tire according to claim 4, wherein in a plan view of the tread portion, the hole has a circular contour shape, and the plurality of projecting pieces comprises at least one first projecting piece curved in a same curvature direction as the circular contour shape of the hole.

6. The winter tire according to claim 5, wherein the plurality of projecting pieces comprises at least one second projecting piece curved in an opposite curvature direction to the circular contour shape of the hole.

7. The winter tire according to claim 4, wherein the plurality of projecting pieces comprises at least one second projecting piece curved in an opposite curvature direction to a circular contour shape of the hole such that a distance between the hole and the at least one second projecting piece enlarges toward both ends of a longitudinal direction of the at least one second projecting piece.

8. The winter tire according to claim 4, wherein each of the plurality of projecting pieces has a flat cross-sectional shape having a long axis (a) and a short axis (b).

9. The winter tire according to claim 8, wherein in a plan view of the tread portion, the edge of the recess has a circular contour shape, and the plurality of projecting pieces is arranged such that the short axis (b) is arranged in a radial direction of the circular contour shape of the edge of the recess.

10. The winter tire according to claim 8, wherein a minimum length of each projection piece of the plurality of projection pieces in the long axis (a) direction is in a range of from 2.5 to 5.0 mm, and a minimum length of the plurality of each of projecting pieces in the short axis (b) direction is in a range of not more than 0.5 times the minimum length of the plurality of each of projecting pieces in the long axis (a) direction.

11. The winter tire according to claim 8, wherein a minimum length of each projection piece of the plurality of projection pieces in the short axis (b) direction is in a range of from 0.10 to 0.20 times a minimum length of the plurality of each of projecting pieces in the long axis (a) direction.

12. The winter tire according to claim 1, wherein a stud pin is embedded into the hole.

13. A winter tire comprising:

a tread portion having a ground contact surface being provided with a recess, the recess having a closed contour edge on the ground contact surface, the recess being provided with a hole for fixing a stud pin and at least one projection extending radially outwardly and arranged within the closed contour edge at a location apart from the hole, wherein the at least one projection extends radially outwardly of the tire beyond the ground contact surface, wherein the at least one projection comprises a plurality of projecting pieces that is arranged so as to surround the hole, and wherein the plurality of projecting pieces comprises at least one second projecting piece curved in an opposite curvature direction to a circular contour shape of the hole such that a distance between the hole and the at least one second projecting piece enlarges toward both ends of a longitudinal direction of the at least one second projecting piece.

14. A winter tire comprising:

a tread portion having a ground contact surface being provided with a recess, the recess having a closed contour edge on the ground contact surface, the recess being provided with a hole for fixing a stud pin and at least one projection extending radially outwardly and arranged within the closed contour edge at a location apart from the hole, wherein the at least one projection comprises a plurality of projecting pieces that is arranged so as to surround the hole, wherein the plurality of projecting pieces comprises at least one second projecting piece curved in an opposite curvature direction to a circular contour shape of the hole such that a distance between the hole and the at least one second projecting piece enlarges toward both ends of a longitudinal direction of the at least one second projecting piece, and wherein the plurality of projecting pieces has a flat cross-sectional shape having a long axis (a) and a short axis (b).

* * * * *